(12) United States Patent
Brouwer et al.

(10) Patent No.: US 7,455,011 B2
(45) Date of Patent: Nov. 25, 2008

(54) APPARATUS AND METHOD FOR PREPARING COFFEE WITH A FINE-BUBBLE FROTH LAYER, IN PARTICULAR CAPPUCCINO

(75) Inventors: Gustaaf Frans Brouwer, Nijkerk (NL); Diederik Kraan, Apeldoorn (NL)

(73) Assignee: Sara Lee/DE N.V. (NL)

( * ) Notice: Subject to any disclaimer, the term of this patent is extended or adjusted under 35 U.S.C. 154(b) by 480 days.

(21) Appl. No.: 11/013,288

(22) Filed: Dec. 13, 2004

(65) Prior Publication Data

US 2005/0139083 A1 Jun. 30, 2005

(51) Int. Cl.
*A47J 31/00* (2006.01)
(52) U.S. Cl. .................... 99/299; 99/302 R; 99/295; 426/433
(58) Field of Classification Search ............. 99/295, 99/299, 302 R; 426/433
See application file for complete search history.

(56) References Cited

U.S. PATENT DOCUMENTS

| 3,320,073 A | * | 5/1967 | Bixby, Jr. et al. ............ 426/433 |
| 3,433,464 A | | 3/1969 | Swafford et al. |
| 4,253,385 A | | 3/1981 | Illy |
| 4,694,740 A | | 9/1987 | Daloz et al. |
| 4,882,982 A | | 11/1989 | Muttoni |
| 5,150,645 A | | 9/1992 | Schiettecatte |
| 5,265,519 A | | 11/1993 | Schiettecatte et al. |
| 5,638,740 A | | 6/1997 | Cai |
| 6,009,792 A | * | 1/2000 | Kraan .................... 99/295 |
| 6,279,460 B1 | * | 8/2001 | Pope ..................... 99/299 |
| 6,412,394 B2 | | 7/2002 | Bonanno |
| 6,499,689 B1 | | 12/2002 | Miyazaki |
| 6,564,697 B2 | * | 5/2003 | Maxwell et al. ............ 99/287 |
| 6,769,352 B2 | | 8/2004 | De Bruin et al. |
| 6,777,007 B2 | * | 8/2004 | Cai ....................... 426/78 |
| 6,840,158 B2 | | 1/2005 | Cai |
| 2002/0022070 A1 | | 2/2002 | Dijs |
| 2004/0107841 A1 | | 6/2004 | Cai |
| 2006/0230942 A1 | | 10/2006 | Noordhuis |
| 2007/0137493 A1 | * | 6/2007 | Van Der Meer et al. ....... 99/279 |

FOREIGN PATENT DOCUMENTS

| DE | 4037366 | 5/1992 |
| DE | 4213895 | 11/1992 |
| DE | 4424835 | 1/1996 |
| EP | 0 878 158 | 11/1998 |

(Continued)

*Primary Examiner*—Reginald L Alexander
(74) *Attorney, Agent, or Firm*—Foley & Lardner LLP

(57) ABSTRACT

An apparatus for preparing a beverage fit for consumption with a fine-bubble froth layer, such as coffee or cappuccino, provided with a beverage unit for dispensing a beverage under pressure, at least one nozzle to which the beverage is fed under pressure to generate a jet of the beverage, a buffer reservoir for collecting the jet of the beverage so that, in use, a liquid level of the beverage is created in the buffer reservoir into which the jet squirts to obtain the fine-bubble froth layer and an outlet path for discharging the beverage with the fine-bubble froth layer from the buffer reservoir, wherein the outlet path is provided with at least one siphon which comes into action for discharging the beverage from the buffer reservoir via the siphon when the liquid level in the siphon exceeds a predetermined height.

35 Claims, 8 Drawing Sheets

FOREIGN PATENT DOCUMENTS

| | | |
|---|---|---|
| EP | 1 092 377 | 4/2001 |
| EP | 0878158 | 3/2002 |
| EP | 1210893 | 6/2002 |
| EP | 1092377 | 9/2005 |
| FR | 2 282 838 | 3/1976 |
| FR | 2282838 | 3/1976 |
| GB | 989996 | 4/1965 |
| NL | 7215523 | 5/1974 |
| NL | 1013270 | 4/2001 |
| WO | WO 89/12416 | 12/1989 |
| WO | WO 0016674 | 3/2000 |
| WO | WO 2004/056246 | 7/2004 |
| WO | WO 2005/016095 | 2/2005 |
| WO | WO 2005/058109 | 6/2005 |
| WO | WO 2005/063094 | 7/2005 |

* cited by examiner

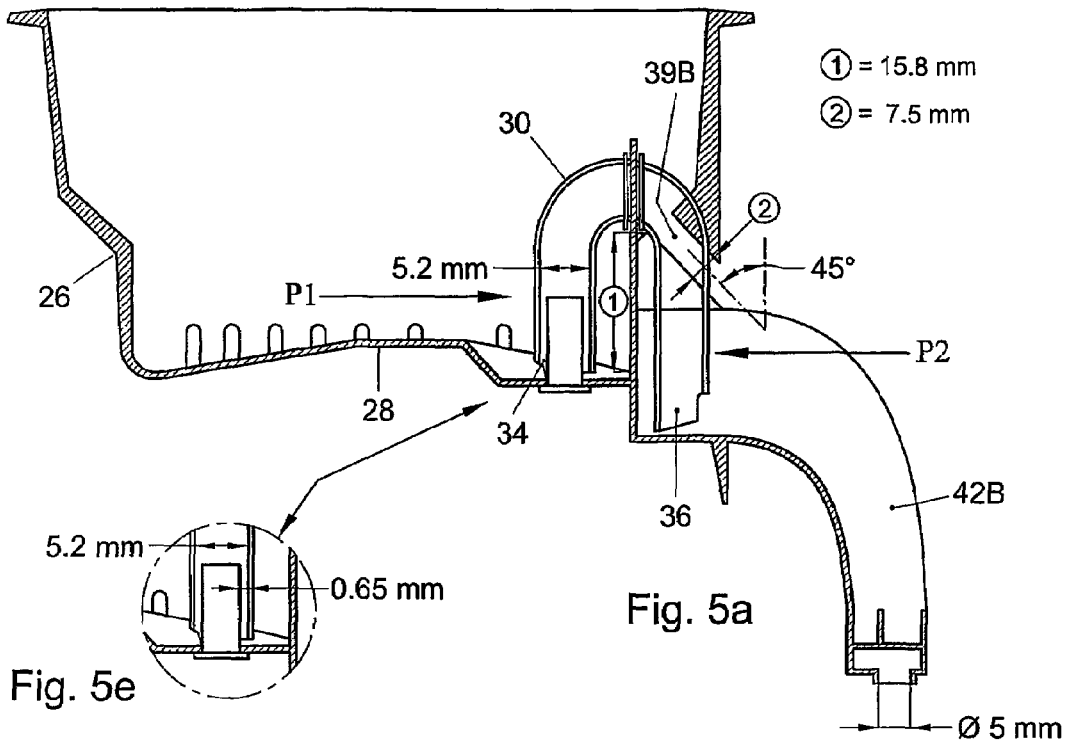
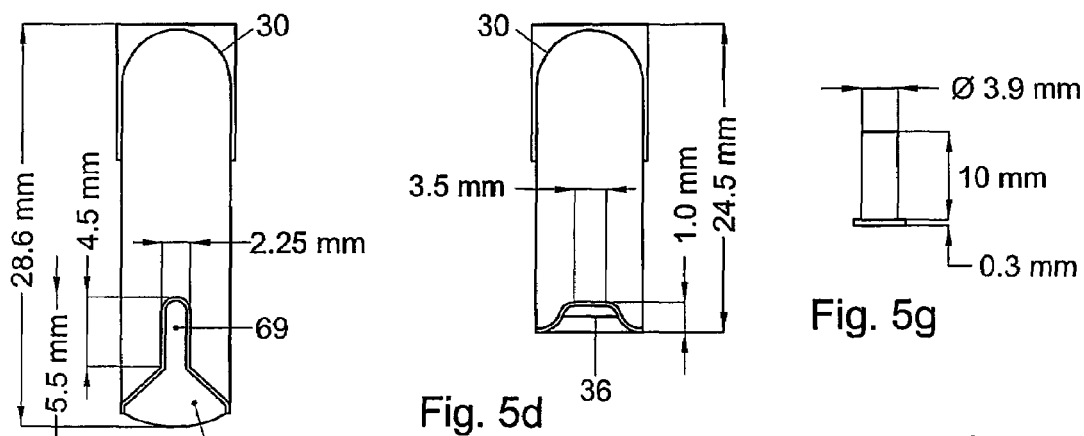
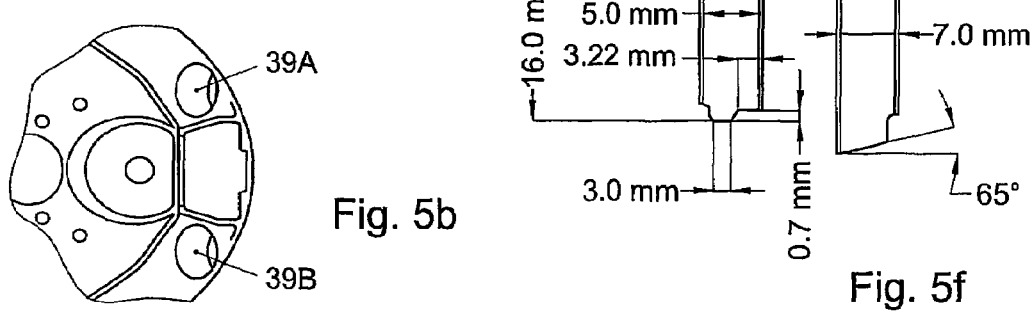

APPARATUS AND METHOD FOR PREPARING COFFEE WITH A FINE-BUBBLE FROTH LAYER, IN PARTICULAR CAPPUCCINO

CROSS REFERENCE TO RELATED APPLICATIONS

This application is a continuation of prior International Application No. PCT/NL03/00428, filed Jun. 12, 2003, which claims priority to The Netherlands Application No. NL1020836 filed on Jun. 12, 2002.

The invention relates to an apparatus for preparing a beverage fit for consumption with a fine-bubble froth layer, such as coffee or cappuccino, provided with a beverage unit for dispensing a beverage under pressure, at least one nozzle to which the beverage is fed under pressure to generate a jet of the beverage, a buffer reservoir for collecting the jet of the beverage so that, in use, a liquid level of the beverage is created in the buffer reservoir into which the jet squirts to obtain the fine-bubble froth layer and an outlet path for discharging the beverage with the fine-bubble froth layer from the buffer reservoir.

The invention also relates to a method for preparing a beverage fit for consumption with a fine-bubble froth layer, such as coffee or cappuccino, in which a liquid jet comprising the beverage is generated, and in which the liquid jet is squirted into a buffer reservoir so that a liquid level of the beverage is created in the buffer reservoir into which the jet squirts to obtain the fine-bubble froth layer, which buffer reservoir is provided with an outlet path for discharging the beverage with the fine-bubble froth layer from the buffer reservoir.

Such an apparatus and method are known from European patent application 0 878 158.

It is found that such an apparatus is very satisfactory for preparing coffee with a fine-bubble froth layer (also called café crème). The fine-bubble froth layer is formed by coffee bubbles which are filled with air.

The known apparatus is particularly provided with relatively small outlet openings which are arranged in the bottom of the buffer reservoir. The outlet openings have such dimensions that, in use, by means of the jet more coffee is fed to the buffer reservoir than leaves the buffer reservoir again via the outlet openings. This has the result that the above liquid level of the beverage is created in the buffer reservoir into which the jet squirts to obtain the fine-bubble froth layer. The outlet path may, for instance, comprise an overflow for discharging the beverage with the fine-bubble froth layer. When sufficient beverage has been prepared, the feed of beverage by means of the jet to the buffer reservoir is stopped. After this, as far as the liquid in the buffer reservoir is below the level of the overflow, the buffer reservoir will empty slowly via the above outlet openings. This slow emptying will take some time and finally result in dripping after. Although the known apparatus is satisfactory, the invention contemplates improving the apparatus in the sense that, if desired, when the feed of the beverage by means of the jet to the buffer reservoir has terminated, the duration of the emptying of the buffer reservoir and the dripping after from the buffer reservoir via the outlet path can be shortened and that, if desired, the apparatus is also suitable for preparing cappuccino. The invention also contemplates enabling the forming of a better froth layer, that is to say a froth layer with more relatively small bubbles.

The apparatus according to the invention is, to this end, characterized in that the outlet path is provided with at least one siphon which comes into action to discharge the beverage from the buffer reservoir via the siphon when the liquid level in the siphon exceeds a predetermined height.

When the apparatus is used to prepare coffee with a fine-bubble froth layer, the buffer reservoir, through the beverage fed to the buffer reservoir by means of a jet, will gradually be filled with the beverage. The jet will then start squirting into the liquid level meanwhile formed in the buffer reservoir to obtain the fine-bubble froth layer. This will soon occur because the buffer need not yet empty. The liquid level in the siphon will then also rise. When the liquid level in the siphon rises sufficiently, the buffer reservoir will start emptying via the siphon. When the feed to the buffer reservoir by means of the jet is stopped, the buffer reservoir will at least practically completely empty via the siphon. This may occur, depending on the dimensions of the siphon, within a relatively short time. There will at least practically be no question of dripping after anymore.

Because due to the siphon the bottom of the buffer reservoir need not be provided with the above-mentioned outlet openings, it is possible, for instance before starting the feed of beverage by means of the jet to the buffer reservoir, to include an amount of concentrated milk in the buffer reservoir. As long as the amount of concentrated milk included in the buffer reservoir does not exceed the above predetermined height, this concentrated milk will remain in the buffer reservoir. When, subsequently, the apparatus is started, the jet of beverage will squirt into the buffer reservoir. The jet of the beverage may, in that example, comprise coffee. As a result, cappuccino with a fine-bubble froth layer is formed. The cappuccino with the fine-bubble froth layer leaves the buffer reservoir via the outlet path. The apparatus is thus also suitable for preparing cappuccino. It is noted that, instead of concentrated milk, milk powder may also be included in the buffer reservoir to prepare cappuccino. In case, for instance, fresh coffee is prepared by means of the beverage unit, a better froth layer will be formed because the above outflow openings need not be provided. Because the above outlet openings need not be provided, the level in the buffer reservoir will rise more rapidly so that the first froth is formed on the basis of coffee extract having a relatively high concentration of solid matter. It is found that precisely such an extract gives a better froth layer, that is to say a froth layer with more relatively small bubbles.

When the buffer reservoir is hermetically sealed from its surroundings, that is to say when the buffer reservoir is only via the siphon in open communication with its surroundings, the pressure in the buffer reservoir can become superatmospheric when the inflow opening of the siphon is closed by the beverage in the buffer reservoir. This has the result that when feeding the jet of the beverage with possible gases to the buffer reservoir, the pressure in the buffer reservoir becomes superatmospheric and that, as a result, the liquid level in the siphon will rise more rapidly than in the buffer reservoir itself. When, contrarily, the buffer reservoir, beside the siphon, has an open communication with its surroundings, the pressure in the buffer reservoir will always be atmospheric. As a result, the level of the liquid in the buffer reservoir will rise equally with the level of the liquid within the siphon and a highest point of the siphon determines the level of the buffer reservoir at which the siphon comes into action.

When the feed of beverage by means of the jet is stopped, while the buffer reservoir is not hermetically sealed from its surroundings, the buffer reservoir will empty via the siphon within a relatively short time, with at least practically no question of dripping after. If the buffer reservoir is hermetically sealed from its surroundings, when stopping the feed of beverage by means of the jet, the flowing through the siphon can stop relatively rapidly because the buffer reservoir cannot be aerated.

In particular it holds that the siphon is provided with a liquid flow path surrounded by at least one channel wall and having an inflow opening located in the buffer reservoir and an outflow opening located outside the buffer reservoir. Preferably, it further holds that the outlet path is further provided with at least one overflow. This has the advantage that, in use, when by means of the jet beverage is fed to the buffer reservoir, the buffer reservoir can empty via the overflow. Simultaneously, the buffer reservoir also empties via the siphon, but the overflow may have a greater flow capacity. In use, the flow rate of the beverage leaving the buffer reservoir via the overflow may therefore be greater than the flow rate of the beverage leaving the buffer reservoir via the siphon. When the feed of the beverage by means of the jet to the buffer reservoir is stopped, the liquid level when fallen to below the overflow can flow out of the buffer reservoir further by means of the above siphon.

In particular it holds that the liquid flow path is formed by an inner channel extending through a bottom of the buffer reservoir, which inner channel is provided with a first open end located at a higher level than the inflow opening and a second open end located outside the buffer reservoir and lower than the bottom, and an outer channel surrounding the inner channel, which outer channel extends to above the first open end and is closed above the first open end, and which outer channel is provided below the first open end with an opening forming the inflow opening of the liquid flow path. The outer channel may then be detachably connected to the buffer reservoir. The outer channel can thus be removed, which facilitates the cleaning of the siphon.

The method according to the invention is characterized in that the outlet path is provided with at least one siphon which comes into action to discharge the beverage via the siphon from the buffer reservoir when the liquid level in the siphon exceeds a predetermined height.

The invention will now be explained in more detail with reference to the drawing. In this drawing:

FIG. 2b shows a cross-section on the line 2B of FIG. 2a;

FIG. 2d shows an outer channel of the siphon according to FIG. 2a;

FIG. 3b shows a side view of the buffer reservoir of FIG. 3a;

FIG. 3c shows a cross-section of the buffer reservoir of FIG. 3a;

FIG. 3d shows a perspective view of an upper side of the buffer reservoir of FIG. 3a;

FIG. 3e shows a perspective view of a lower side of the buffer reservoir of FIG. 3a;

FIG. 3f shows a cross-section of the siphon of FIG. 3a;

FIG. 5a shows a cross-section of a third alternative embodiment of a buffer reservoir with siphon of the apparatus according to FIG. 1;

FIG. 5b shows a top view of a part of a buffer reservoir with siphon according to FIG. 5a;

FIG. 5c shows a view of the siphon according to the arrow P1 of FIG. 5a;

FIG. 5d shows a view of the siphon according to the arrow P2 of FIG. 5a; and

FIGS. 5e, 5f and 5g show a part of the drawing according to FIG. 5a.

Figure 1:
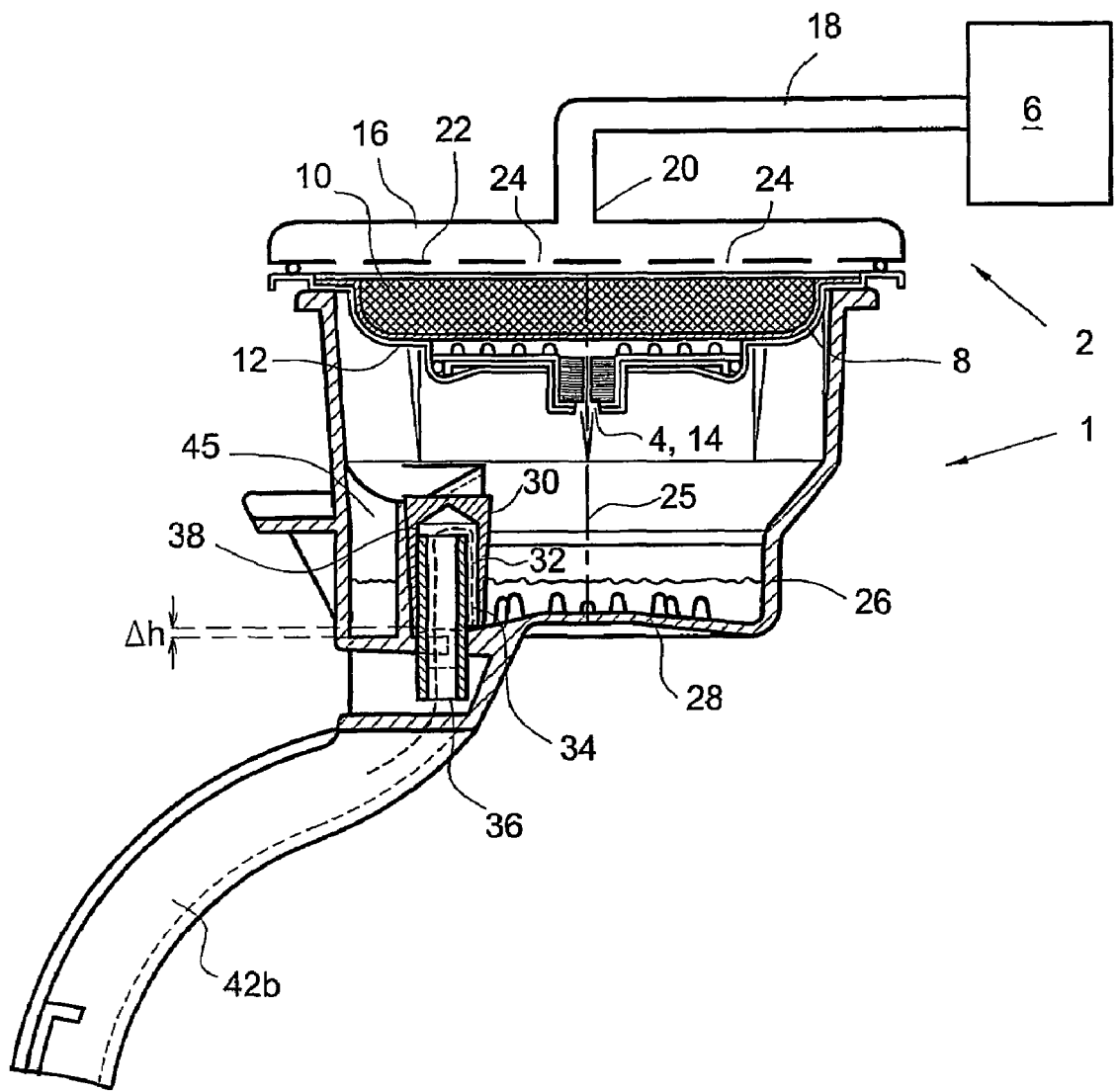
FIG. 1 shows a possible embodiment of an apparatus according to the invention for carrying out a method according to the invention.

In FIG. 1 reference numeral 1 denotes an apparatus for preparing coffee with a fine-bubble froth layer, in particular cappuccino. The apparatus is provided with a beverage unit 2 for dispensing a beverage under pressure to at least one nozzle 4 of the apparatus. The beverage unit 2 is, in this example, provided with a hot water unit 6 which is arranged to dispense hot water under pressure. Furthermore, the beverage unit 2 is provided with a holder 8 which is arranged to receive a coffee pad 10. The assembly of holder 8 and coffee pad 10 may, for instance, be made as described in European patent application EP A 0 904 717. The coffee pad extends over a bottom 12 of the holder 8, which bottom is provided with an outflow opening 14 which, in this example, also forms the nozzle 4.

The beverage unit 2 is further provided with a cover 16 with which the holder 8 can be closed when filled with the coffee pad 10. The hot water is fed from the hot water unit 6 by means of a hose 18 to a feed opening 20 of the hollow cover 16. The hollow cover 16 is provided at its lower side with a plate 22 which is provided with a number of outflow openings 24. In use, the hot water flows under pressure from the hot water unit 6 via the hose 18 to an inner space of the cover 16 to subsequently leave the cover 16 by means of the outflow openings 24 in the plate 22. The hot water is thus fed to an upper side of the holder 8. The hot water is then pressed through the pad after which coffee extract is formed. This coffee extract is pressed under pressure generated by the beverage unit 2 through the nozzle 4 so that a jet 25 of beverage, in this example coffee extract, is formed.

The apparatus is further provided with a buffer reservoir 26 for collecting the jet of the beverage. The buffer reservoir is, in this example, provided with a bottom 28 which is made slightly convex. The apparatus is further provided with a siphon 30 for discharging beverage from the buffer reservoir via the siphon when a liquid level in the siphon exceeds a predetermined height. This predetermined height will also be designated lower down as the overflow level of the siphon.

The siphon 30 is provided with a liquid flow path surrounded by channel walls and denoted in FIG. 1 by reference numeral 32. The liquid flow path extends through an inflow opening 34 of the siphon. The inflow opening 34 is located in the buffer reservoir above the bottom. The liquid flow path extends downstream through an outflow opening 36 of the siphon. The outflow opening 36 is located outside the buffer reservoir and lies lower than the inflow opening.

Furthermore, the siphon is provided with a highest point 38 which is higher than the inflow opening 34.

The siphon 30 forms an outlet path of the buffer reservoir 26 for discharging beverage from the buffer reservoir. The outlet path is, in this example, further provided with a first overflow 39A and a second overflow 39B. The overflows 39A and 39B are each arranged in a raised side wall 40 of the buffer reservoir. The overflows are formed by outflow openings 41A and 41B which are arranged in the raised side wall 40. The outflow openings 41A and 41B extend from an overflow level upward in the raised side wall 40 to an upper edge 43 of the raised side walls and are therefore not limited upward. It is also possible, however, that the outflow openings 41A and 41B extend from the overflow level to below the upper edge 43, which means that the outflow openings are limited upward. Downstream of the overflows 39A and 39B overflow paths 43A and 43B extend to outflow openings 45A and 45B, which overflow paths are separated by a separation wall 47. Via the outflow opening 35A liquid can flow from the buffer reservoir to a first outlet 42A of the apparatus to leave the apparatus via this outlet. Quite analogously, beverage can flow via the outflow opening 45B to a second outlet 42B to leave the apparatus via the second outlet 42B.

Figure 2A:
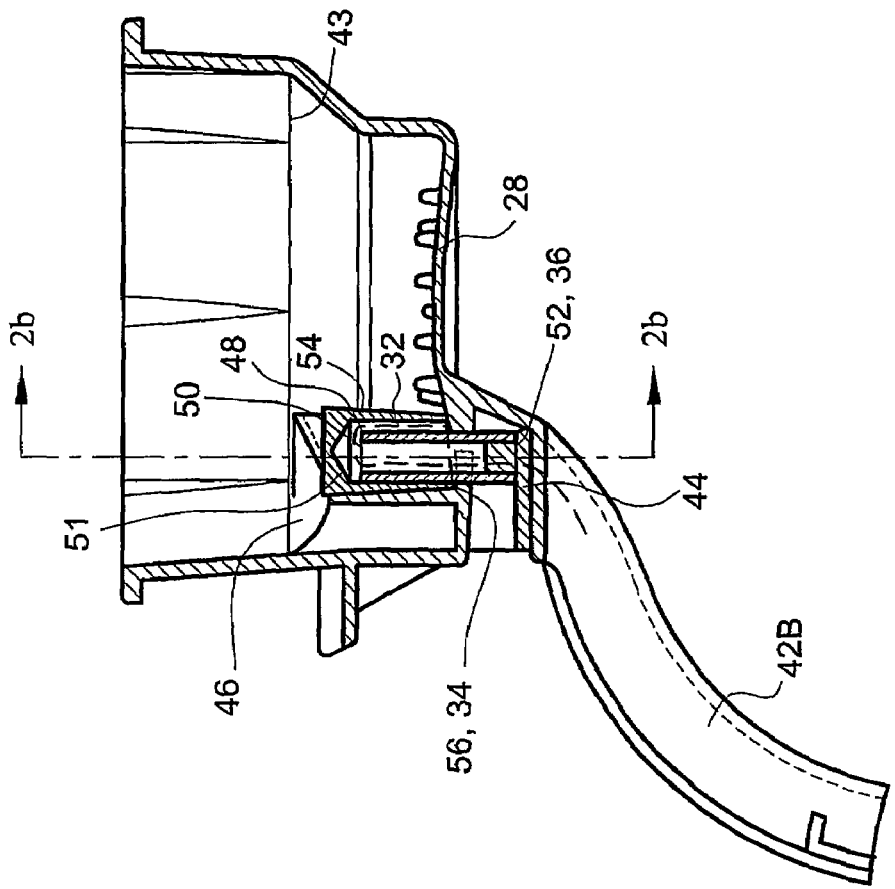
FIG. 2a shows a cross-section of a buffer reservoir with siphon and an outlet of the apparatus according to FIG. 1.
Figure 2B:
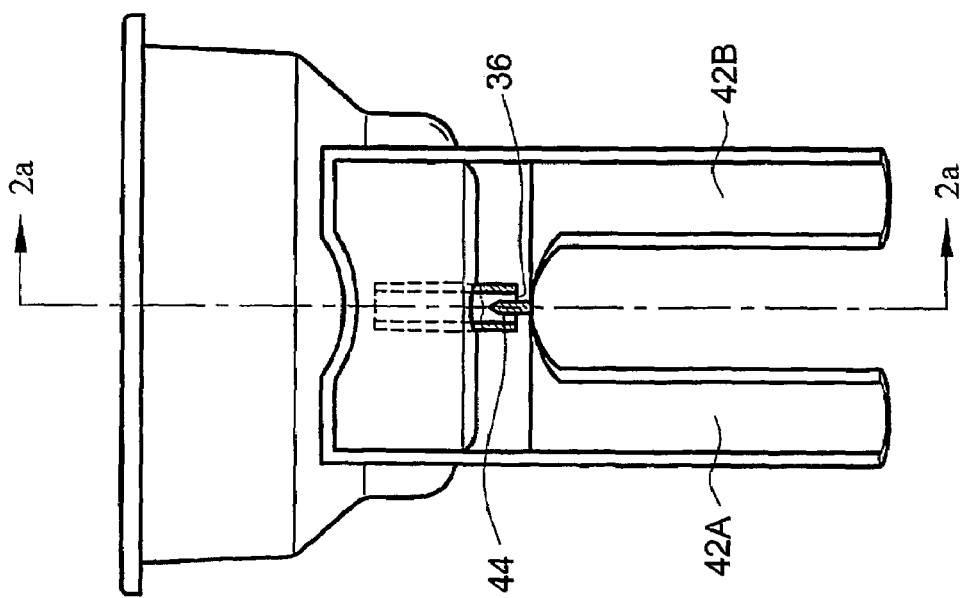
Figure 2C:
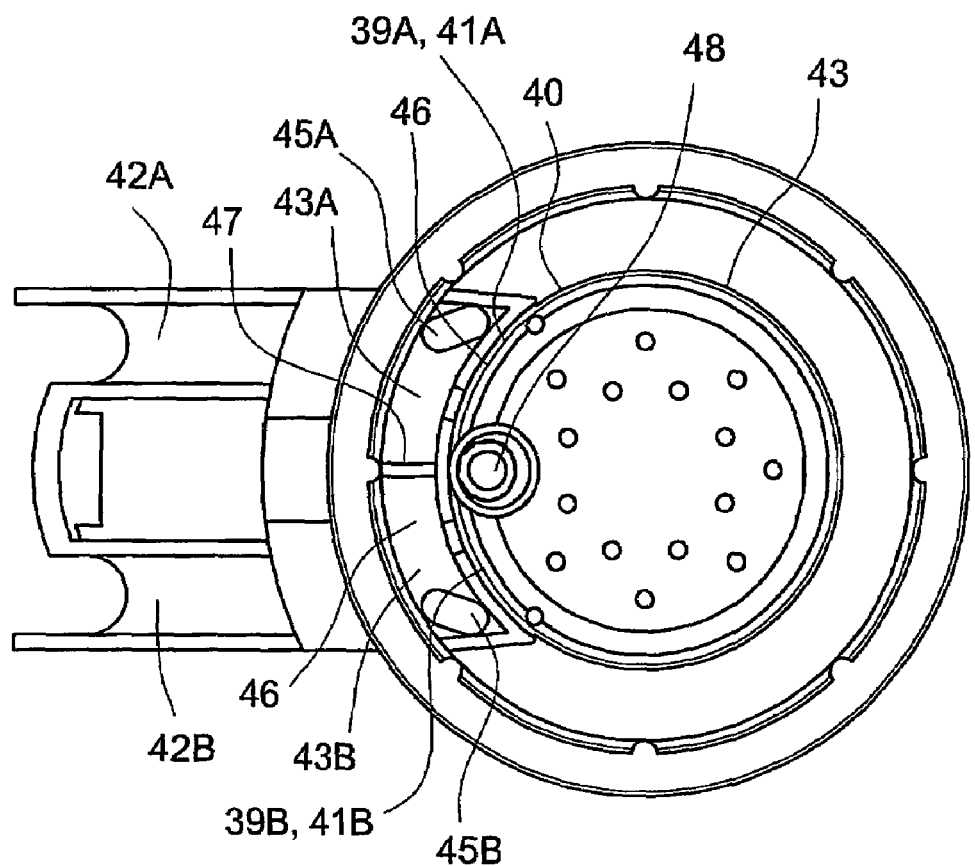
FIG. 2c shows a top view of the parts of FIG. 2a, which top view is made transparent relative to the siphon.

As can be seen in FIGS. 2b and 2c, a separation wall 44 distributing a liquid flow from the siphon over the outlet 42A and the outlet 42B is located below the outflow opening 36 of the siphon 30. The liquid leaving the buffer reservoir via the siphon will therefore be equally distributed over the outlets 42A and 42B to leave the apparatus via the outlets 42A and 42B.

Figure 4:
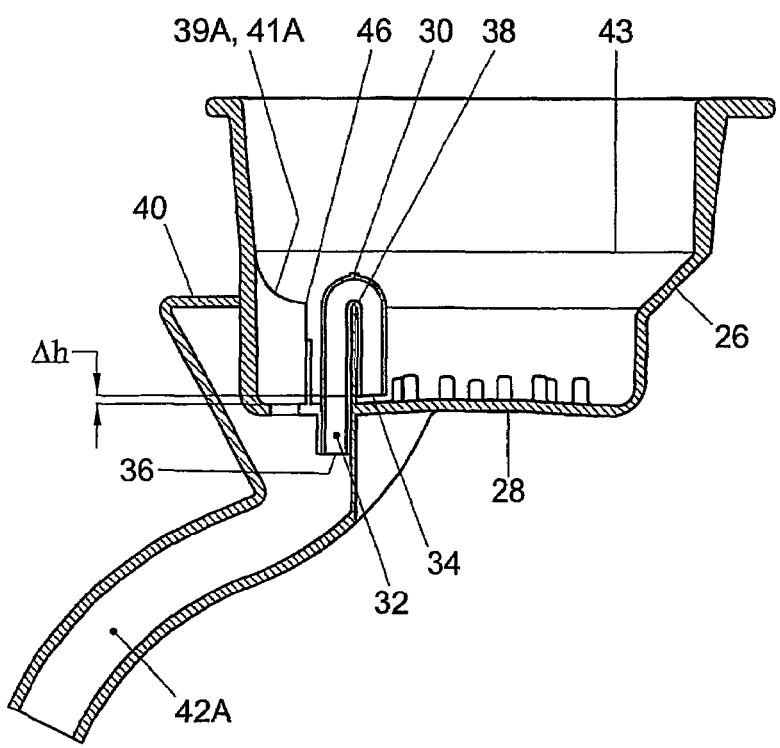
FIG. 4 shows a second alternative embodiment of a buffer reservoir with siphon of the apparatus according to FIG. 1.

In this example, it further holds that the lowest points 46 of the overflows each lie at the same height as or higher than the inflow opening 34 of the siphon 30. Furthermore, it holds in this example that the respective lowest points 46 of the overflows are each lower than the highest point 38 of the siphon. A highest point of the siphon is understood herein to be the minimum height that a liquid molecule must at least rise so as to be able to flow through the siphon. The above lowest points determine the overflow level of the respective overflow 39A, 39B. It is also possible, however, that the lowest points 46 of the overflows 39A, 39B are each higher than the highest point 38 of the siphon 30 (see FIG. 4).

Figure 2D:
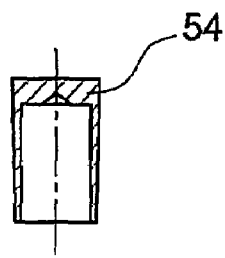

In this example, it further holds (see FIG. 2a) that the liquid flow path 32 is formed by an inner channel 48 extending through the bottom 28 of the buffer reservoir. The inner channel 48 is provided with a first open end 50 which is located at a higher level than the inflow opening 34. Furthermore, the open end 50 is located within the buffer reservoir. The inner channel is further provided with a second open end 52 located outside the buffer reservoir and preferably below the bottom. The second open end 52 corresponds to the above outflow opening 36. The siphon is further provided with an outer channel 54 which surrounds the inner channel 48. The outer channel 54 extends to above the first open end 50 of the inner channel 48 and is closed above this first open end 51. The outer channel is provided below the first open end 50 with an opening 56 which forms the inflow opening of the liquid flow path. In this example, the opening 56 is formed by an open end of the outer channel 54. This open end is not completely closed by the bottom 28 of the buffer reservoir because the bottom 28 of the buffer reservoir is made convex. The outer channel 54 is detachably connected to the buffer reservoir and can therefore be removed, as shown in FIG. 2d. In this example, it also holds that the siphon is provided with a highest point which is higher than the inflow opening. It further holds that the outflow opening is located lower than a lowest part of the bottom. It also holds that the inflow opening is located above a lowest point of the bottom of the buffer reservoir.

The hitherto described apparatus operates as follows.

A jet of coffee extract beverage is, as described above, squirted into the buffer reservoir. As a result, a liquid level of the beverage will be created in the buffer reservoir. Preferably, at least a 5 mm high level is formed. During impact of the jet of the beverage into the liquid level, air is beaten into the beverage. As a result, a fine-bubble froth layer is formed. The liquid level will thus start rising in the buffer reservoir. The liquid level will then also start rising in a space within the siphon located within the outer channel 54 and outside the inner channel 48. If the buffer reservoir is in open communication with the surroundings, the pressure in the buffer reservoir will be atmospheric and the level in the buffer reservoir is equal to the level within the siphon. It is possible, however, that the buffer reservoir has an open communication with its surroundings only via the siphon. The overflows 39A and 39B are, in that case, not present and the holder 8, in use, hermetically seals the buffer reservoir. When the level of the liquid within the buffer reservoir is above the inflow opening 34, the pressure in the buffer reservoir will start increasing as a result of the feed of liquid and possible gases (air) from the holder 8 to the buffer reservoir. As a result of this possible elevated pressure in the buffer reservoir, the liquid level in the siphon (here in the siphon outside the inner tube and inside the outer tube) will start rising more rapidly than in the buffer reservoir itself. In the embodiment according to FIG. 1, the overflows 39A and 39B are present, however. When the liquid level in the siphon rises sufficiently, it will rise above the highest point 38, that is to say above the open end 50 of the inner channel 48. The liquid in the siphon can thus rise to the overflow level of the siphon. From that moment the siphon can come into action, and beverage will start flowing from the buffer reservoir 26 via the inner channel 48. The beverage with the fine-bubble froth layer which leaves the outflow opening 36 is equally distributed by the separation wall 44 over the outlet 42A and the outlet 42B. Because, in this example, the capacity of the siphon, that is to say the flow rate of the siphon, is smaller than the flow rate of the jet, the liquid level of the beverage, when the siphon is in action, will rise further. The size of the liquid flow through the siphon is co-determined by the height difference between the inflow opening 34 and the outflow opening 36 of the siphon. This further rising of the liquid level will continue until the liquid level reaches the lowest point 46, that is to say the overflow level of the overflows 39A, 39B. After this the buffer reservoir will also start emptying via the overflows 39A, 39B. The liquid leaving the buffer reservoir via the overflows 39A, 39B will flow further from the outlets 42A and 42B. The liquid leaving the buffer reservoir via the overflows is equally distributed to the outlets 42A and 42B. The coffee with the fine-bubble froth layer thus leaves the buffer reservoir via the outlets 42A and 42B by means of the above overflows and the siphon.

When, subsequently, sufficient coffee has been prepared, the feed of the beverage by means of the jet to the buffer reservoir is terminated. Shortly afterwards or immediately, the emptying of the buffer reservoir via the above overflows will be terminated. After this the buffer reservoir will empty relatively rapidly via the siphon 30. As a result of the convex form of the bottom, the beverage flows to a lowest part of the bottom. Because the inflow opening of the siphon is located near this lowest part, the reservoir can thus empty practically completely. Preferably, therefore, the inflow opening of the siphon is located (just) above the lowest part of the bottom so that the buffer reservoir can empty at least practically via the siphon. When the buffer reservoir is at least practically empty, the emptying of the buffer reservoir via the siphon will be terminated abruptly. There is therefore hardly any question of dripping after. The liquid level in the buffer reservoir is then practically zero. This height relative to a lowest point of the bottom is denoted in FIG. 1 by $\Delta h$.

When cappuccino is prepared with the apparatus according to the invention, for instance an amount of concentrated milk is brought into the buffer reservoir. The holder 8 is, in this example, loosely placed on the buffer reservoir 26 and can be removed for filling the buffer reservoir with the concentrated milk. As long as the amount of concentrated milk in the buffer reservoir remains below the highest point 38 of the siphon 30, the buffer reservoir will not empty. A user is therefore in a position to fill the buffer reservoir at his leisure with the concentrated milk. After this the holder 8 can be positioned on the buffer reservoir 26 again, as shown in FIG. 1. Also, the holder 8 can be opened and filled with a coffee pad and then be closed with the cover 16. When, subsequently, the beverage unit 2 is started, hot water is pressed through the pad 10 to obtain beverage in the form of coffee extract. By means of the nozzle 4 this coffee extract forms a jet which impacts into the milk concentrate already contained in the buffer reservoir. Through the impact of the coffee extract into the milk concentrate air bubbles are also beaten into the liquid contained in the buffer reservoir. The milk concentrate is then diluted with the coffee concentrate, which has the result that frothed milk is formed. This frothed milk leaves the buffer reservoir by means of the above overflow and the siphon, as described before. Also, the coffee extract leaves the buffer reservoir in mixed or unmixed form with the milk concentrate via the overflow and the siphon. Cappuccino is thus formed and collected in one or two cups placed below the outlets 42A and 42B.

The invention is by no means limited to the above-described embodiment. Thus, the buffer reservoir can be hermetically sealed by the holder. When for preparing a cappuccino the hot water unit 6 is started, this means that first the pressure in the buffer reservoir will rise because from the holder first some air and then liquid is fed to the buffer reservoir. When milk or milk concentrate is contained in the buffer reservoir with a liquid level located above the inflow opening 34 of the siphon, this will immediately start flowing through the siphon as a result of the elevated pressure in the buffer reservoir. The siphon therefore comes into action already before the liquid level in the buffer reservoir has reached the overflow level of the siphon. Once the siphon is in action, it will continue to flow as long as the buffer reservoir is filled to above the inflow opening 34 of the siphon. When for preparing a café crème no milk or milk concentrate is included, the pressure will not immediately rise in the buffer reservoir when the hot water unit 6 starts. The air and liquid fed from the holder to the buffer reservoir cannot rise the pressure because via the siphon the buffer reservoir is in open communication with the outside world. When after some time the liquid level in the buffer reservoir rises to above the inflow opening 34, the above effect of the pressure rise in the buffer reservoir can possibly occur so that the siphon already begins to flow before the liquid in the buffer reservoir rises to above the highest point 38. Because the buffer reservoir can be hermetically sealed, this also has the result that when the hot water unit stops, the flow through the siphon stops relatively rapidly because air cannot or can hardly be drawn into the buffer reservoir so that a reduced pressure is created in the buffer reservoir. Also, to prepare cappuccino, the buffer reservoir can be filled with milk powder instead of concentrated milk. Besides, the jet of coffee extract may also be formed in a manner other than by means of the beverage unit 2. Also, a multiplicity of nozzles may be used. Moreover, a beverage other than coffee can be fed to the buffer reservoir. For instance a jet of tea, chocolate milk etc. may then be considered.

In this example, the bottom of the buffer reservoir is made convex, and the siphon is located near a lowest point of the bottom. It is also possible, however, that the bottom is flat and/or that the siphon is at another position. In this example, the inflow opening 34 of the siphon is formed by the open end of the outer channel. It is also possible, however, that the inflow opening 34 is provided in a side wall of the outer channel. In this example, the inner channel extends through an opening of the bottom to far below the bottom of the buffer reservoir. But this is not necessary. The part of the inner channel that projects from the buffer reservoir may, for instance, be omitted.

Figure 3A:
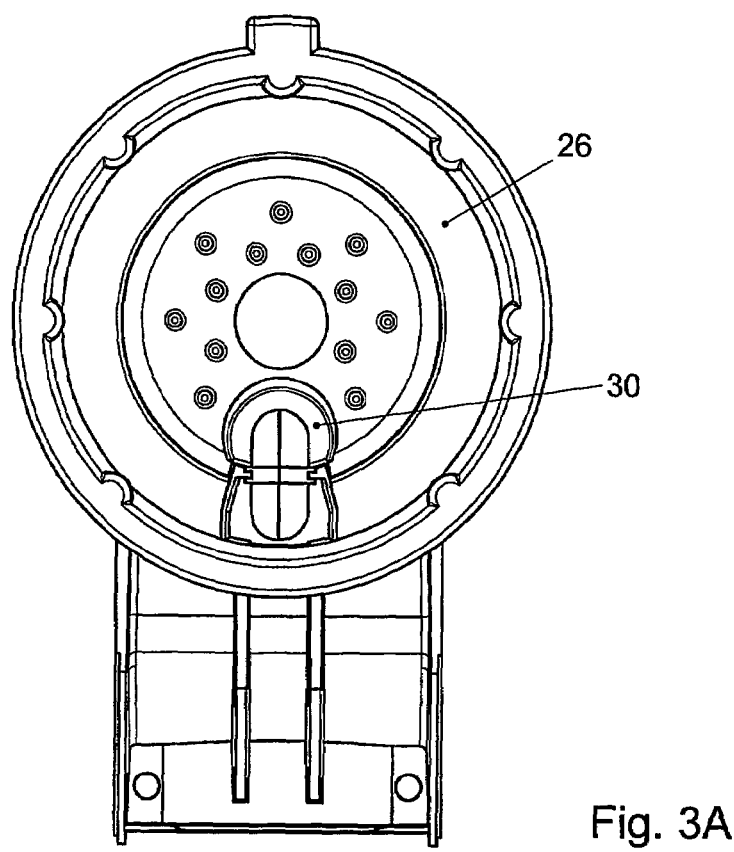
FIG. 3a shows a top view of a first alternative embodiment of a buffer reservoir with siphon of the apparatus according to FIG. 1.
Figure 3B:
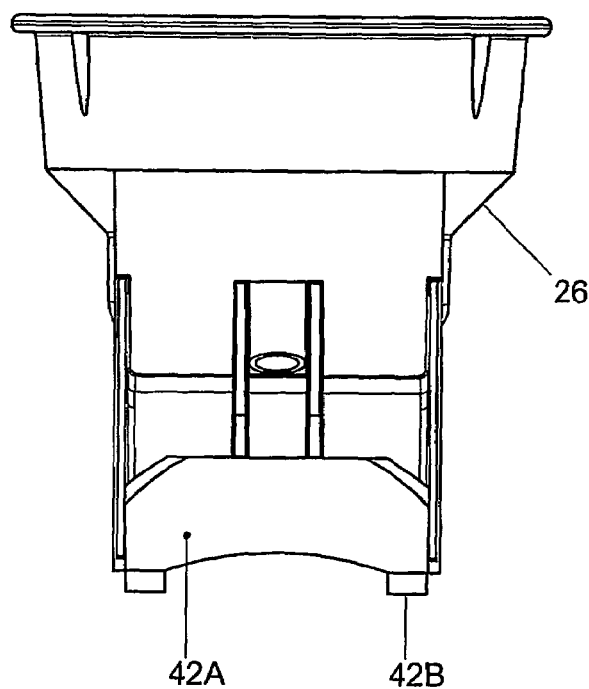
Figure 3C:
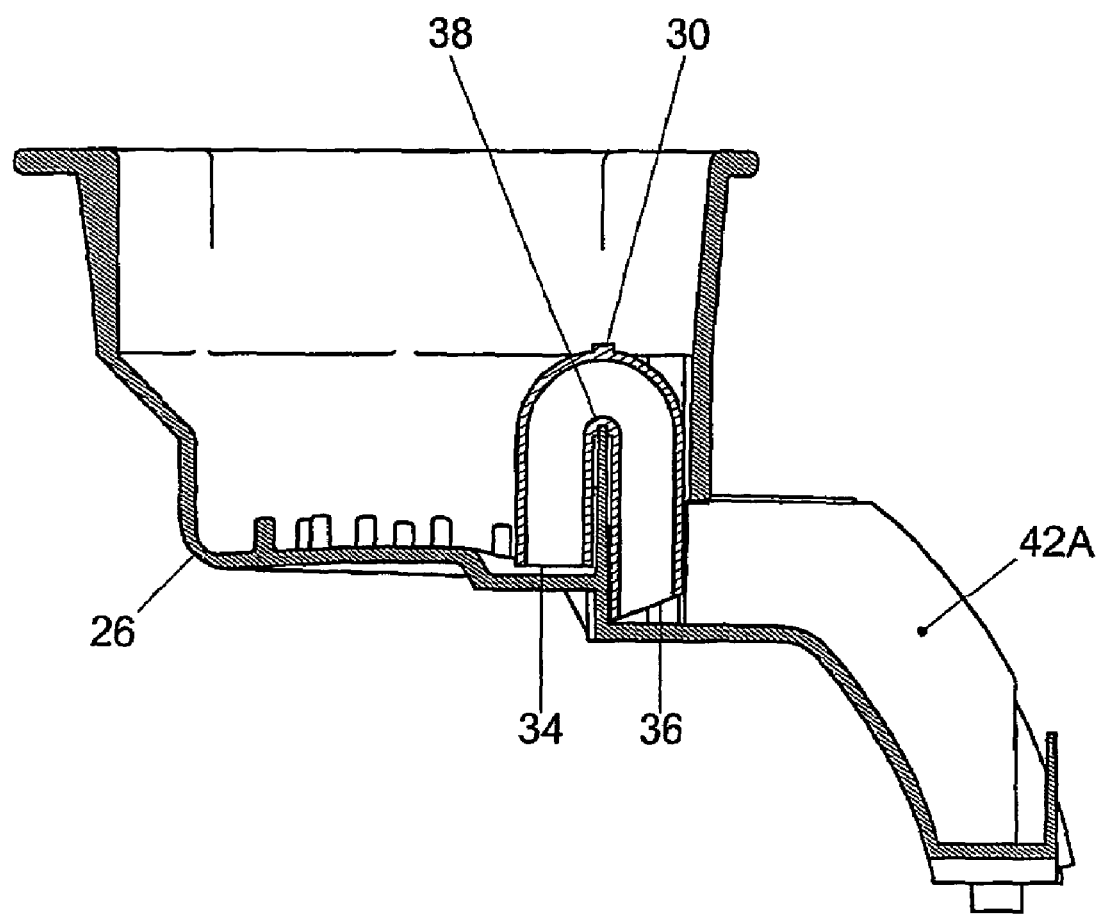
Figure 3D:
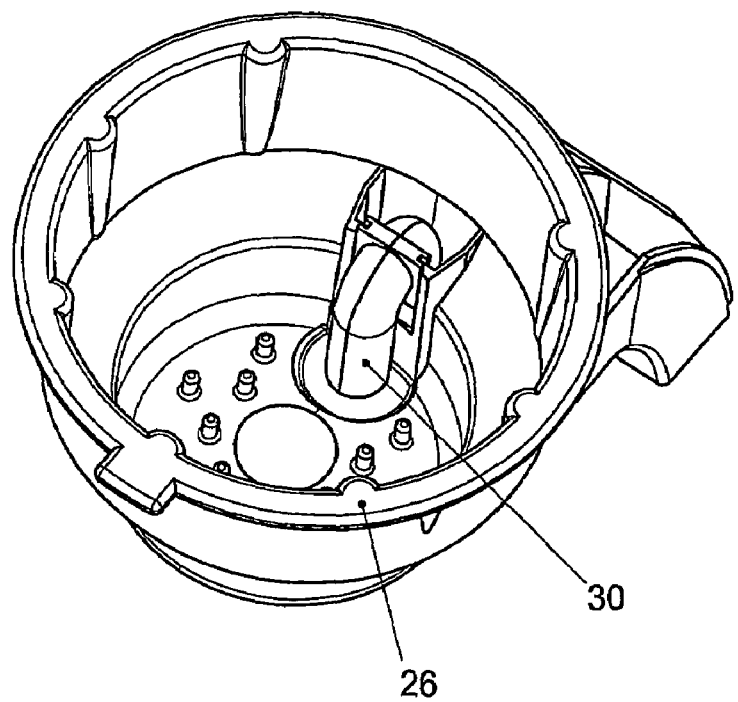
Figure 3E:
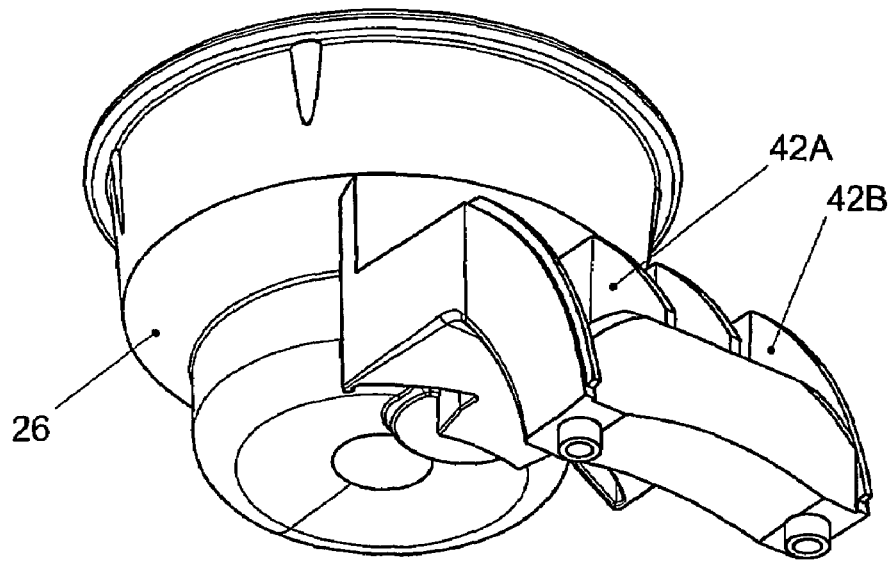
Figure 3F:
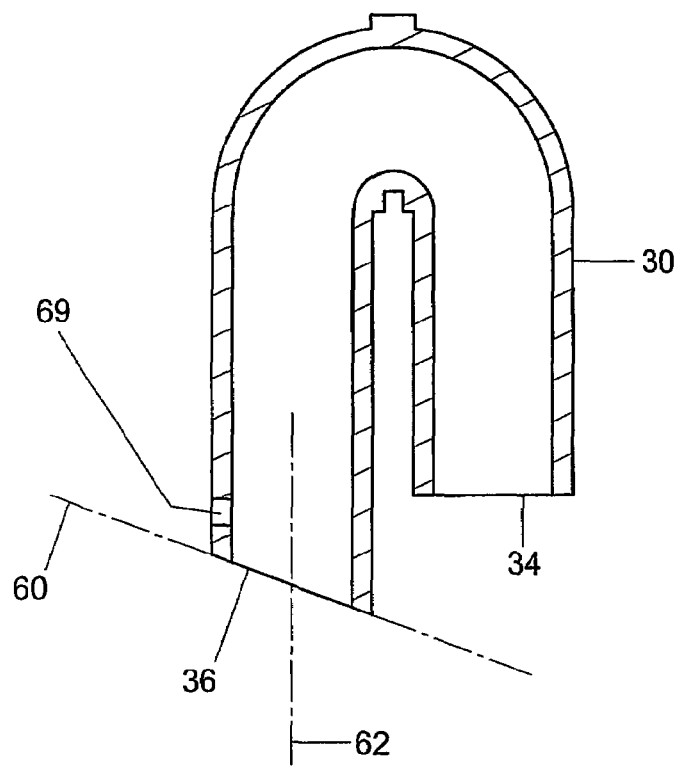

In this example, the siphon is formed by a combination of an inner channel and an outer channel. Other siphons, such as a tube bent to a U-shape, as shown in FIGS. 3a-3e and 4, are also conceivable. In FIGS. 1, 3a-3e and 4, similar parts are denoted by the same reference numerals. It further holds for the variant of FIGS. 3a-3e that the buffer reservoir is not provided with the overflows 39A and 39B. The siphon then forms, in use, the only open communication with the outside world, provided that the holder hermetically seals the buffer reservoir. But this is not necessary. As can be seen in FIG. 3c, the plane 50 of the outflow opening 36 encloses an angle deviating by 90° with an axial axis 52 of the siphon above the outflow opening 36. In other words, this axial axis 52 is not perpendicular to the plane 50. This reduces the risk of droplets sticking to the outflow opening 36 so that the siphon could come into action too rapidly again. Furthermore, just above the outflow opening 36 an aeration hole 54 or slot may optionally be provided which is located at a level lower than the inflow opening 34. This also reduces the above risk. Besides, an embodiment is conceivable in which the channel 54 is not higher than the inner channel, and in which near an upper side of the inner channel a throughflow opening is arranged which determines the overflow level of the siphon.

In the apparatus according to FIGS. 5a-5f, it is further shown that in the siphon near the inflow opening 34 of the siphon a filling member 70 may be included which, in this example, has the shape of a cylinder. The filling member extends at least partly in the part of the siphon extending from the inflow opening 34 in upward direction.

The filling member provides a capillary action in the siphon between the inner side of the siphon and the filling member. On the other hand, between the inner side of the siphon and the filling member a relatively large throughflow surface is obtained. Without the filling member 70, to obtain a comparable capillary action, the inner diameter of the siphon near the inflow opening 34 should be reduced. This reduced diameter, however, also gives an (undesirable) reduced throughflow surface.

The filling member also has the advantage that the amount of liquid which, on termination of the siphon action, "falls back" into the reservoir is reduced. The slit 69 is beveled to ensure that the siphon properly empties after termination of the siphon action. The overflows 39A and 39B may be omitted in each of the embodiments.

In the apparatus according to FIGS. 1-4, the diameter of the siphon near the inflow opening 34 may be reduced to promote the capillary action. In each of the apparatuses, the position of the overflows 39A and 39B may be lowered to reduce the functional content of the buffer reservoir.

The position of the outflow opening 36 of the siphon may be lowered to the point where the beginnings of the two outlets 42A, 42B are formed. The siphon and/or the buffer reservoir may be manufactured from, for instance, POM, PP, a metal etc. The sizes shown in FIG. 7 may, for instance, each vary from 30 to 250% of the sizes shown, preferably from 50 to 150% of the sizes shown. The distance between the inflow opening 34 and the bottom 28 is preferably minimized to minimize, after termination, the amount of residual liquid in the buffer reservoir.

Such variants are each considered to fall within the scope of the invention.

The invention claimed is:

1. An apparatus for preparing a beverage fit for consumption with a fine-bubble froth layer, such as coffee or cappuccino, provided with a beverage unit for dispensing the beverage under pressure, at least one nozzle to which the beverage is fed under pressure to generate a jet of the beverage, a buffer reservoir for collecting the jet of the beverage so that, in use, a liquid level of the beverage is created in the buffer reservoir into which the jet squirts to obtain the fine-bubble froth layer and an outlet path for discharging the beverage with the fine-bubble froth layer from the buffer reservoir, wherein the outlet path is provided with at least one siphon which comes into action to discharge the beverage from the buffer reservoir via the siphon when the liquid level in the siphon exceeds a predetermined height, wherein the outlet path is further provided with at least one overflow provided within the buffer reservoir.

2. An apparatus for preparing a beverage fit for consumption with a fine-bubble froth layer, such as coffee or cappuccino, provided with a beverage unit for dispensing the beverage under pressure, at least one nozzle to which the beverage is fed under pressure to generate a jet of the beverage, a buffer reservoir for collecting the jet of the beverage so that, in use, a liquid level of the beverage is created in the buffer reservoir into which the jet squirts to obtain the fine-bubble froth layer and an outlet path for discharging the beverage with the fine-bubble froth layer from the buffer reservoir, wherein the outlet path is provided with at least one siphon which comes into action to discharge the beverage from the buffer reservoir via the siphon when the liquid level in the siphon exceeds a predetermined height, wherein the buffer reservoir is sealed from the atmosphere and has an open communication with its surroundings only via the siphon.

3. An apparatus for preparing a beverage fit for consumption with a fine-bubble froth layer, such as coffee or cappuccino, provided with a beverage unit for dispensing the beverage under pressure, at least one nozzle to which the beverage is fed under pressure to generate a jet of the beverage, a buffer reservoir for collecting the jet of the beverage so that, in use, a liquid level of the beverage is created in the buffer reservoir into which the jet squirts to obtain the fine-bubble froth layer and an outlet path for discharging the beverage with the fine-bubble froth layer from the buffer reservoir, wherein the outlet path is provided with at least one siphon which comes into action to discharge the beverage from the buffer reservoir via the siphon when the liquid level in the siphon exceeds a predetermined height;
wherein the siphon is provided with a liquid flow path surrounded by at least one channel wall and having an inflow opening located in the buffer reservoir and an outflow opening located outside the buffer reservoir;
wherein the siphon is provided with a highest point which is higher than the inflow opening;
wherein the outflow opening is located lower than a lowest part of the bottom
wherein the inflow opening is located above a lowest point of the bottom of the buffer reservoir;
wherein the bottom of the buffer reservoir is made convex;
wherein the liquid flow path is formed by a U-shaped channel;
wherein the outlet path is further provided with at least one overflow provided within the buffer reservoir.

4. An apparatus according to claim 3, wherein the liquid flow path is formed by an inner channel extending through a bottom of the buffer reservoir, which inner channel is provided with a first open end located at a higher level than the inflow opening and a second open end located outside the buffer reservoir and lower than the bottom, and an outer channel surrounding the inner channel, which outer channel extends to above the first open end and is closed above the first open end, and which outer channel is provided below the first open end with an opening forming the inflow opening of the liquid flow path.

5. An apparatus according to claim 4, wherein the outer channel is detachably connected to the buffer reservoir.

6. An apparatus according to claim 3, wherein the buffer reservoir has an open communication with its surroundings only via the siphon.

7. An apparatus according to claim 3, wherein the overflow level of the overflow lies at the same height as or higher than the inflow opening of the siphon.

8. An apparatus according to claim 7, wherein an overflow level of the overflow is lower than the highest point of the siphon.

9. An apparatus according to claim 8, wherein a plane of the outflow opening encloses an angle deviating by 90° with an axial axis of the siphon above the outflow opening of the siphon.

10. An apparatus according to claim 9, wherein just above the outflow opening of the siphon an aeration hole is provided which is located at a level lower than the inflow opening of the siphon.

11. An apparatus according to claim 10, wherein the beverage unit is provided with a hot water unit for dispensing hot water under pressure and a holder arranged to receive a coffee pad, to which holder, in use, the hot water is fed so that the hot water is pressed through the pad to obtain the beverage, which holder is provided with an outflow opening for the beverage, which outflow opening is in fluid communication with the nozzle and/or the nozzles.

12. An apparatus according to claim 11, wherein in the siphon near the inflow opening of the siphon a filling member is included in which, in use, between an inner side of the siphon and the filling member a capillary action occurs so that the beverage flows into the siphon.

13. An apparatus according to claim 12, wherein the filling member extends from the inflow opening of the siphon in upward direction of the siphon.

14. An apparatus according to claim 13, wherein the filling member has the shape of a cylinder.

15. A method for preparing a beverage fit for consumption with a fine-bubble froth layer, such as coffee or cappuccino, the method comprising:
generating a liquid jet comprising the beverage;
squirting the liquid jet into a buffer reservoir so that a liquid level of the beverage is created in the buffer reservoir into which the jet squirts to obtain the fine-bubble froth layer,
providing the buffer reservoir with an outlet path for discharging the beverage with the fine-bubble froth layer from the buffer reservoir;
providing the outlet path with at least one siphon which comes into action for discharging the beverage via the siphon from the buffer reservoir when the liquid level in the siphon exceeds a predetermined height;
wherein the liquid jet comprises coffee and that in the buffer reservoir an amount of concentrated milk or milk powder is included to prepare cappuccino.

16. A method according to claim 15, wherein the concentrated milk or the milk powder is included in the buffer reservoir before the jet of beverage is generated.

17. A method according to claim 16, wherein the siphon is provided with a liquid flow path surrounded by at least one channel wall and having an inflow opening located in the buffer reservoir and an outflow opening located outside the buffer reservoir.

18. A method according to claim 17, wherein the siphon is provided with a highest point which is higher than the inflow opening.

19. A method according to claim 18, wherein the outflow opening is located lower than a lowest part of a bottom of the buffer reservoir.

20. A method according to claim 19, wherein the inflow opening is located above a lowest point of the bottom of the buffer reservoir.

21. A method according to claim 20, wherein the bottom is made convex.

22. A method according to claim 21, wherein the buffer reservoir is hermetically sealed such that it has a communication with surroundings of the buffer reservoir only via the siphon.

23. A method according to claim 22, wherein the outlet path is further provided with at least one overflow.

24. A method according to claim 23, wherein a lowest point of the overflow is higher than the highest point.

25. A method according to claim 23, wherein an overflow level of the overflow lies at the same height as or higher than the inflow opening.

26. A method according to claim 25, wherein the liquid flow path is formed by an inner channel extending through a bottom of the buffer reservoir, which inner channel is provided with a first open end located at a higher level than the inflow opening and a second open end located outside the buffer reservoir and lower than the bottom, and an outer channel surrounding the inner channel, which outer channel extends to above the first open end and is closed above the first open end, and which outer channel is provided below the first open end with an opening forming the inflow opening of the liquid flow path.

27. A method according to claim 26, wherein the outer channel is detachably connected to the buffer reservoir.

28. A method according to claim 25, wherein the liquid flow path is formed by a U-shaped channel.

29. A method according to claim 28, wherein the jet of beverage is prepared by means of a nozzle to which the beverage is fed under pressure.

30. A method according to claim 29, wherein by means of a hot water unit hot water is fed under pressure to a holder in which a coffee pad is received which extends with a first side along a bottom of the holder, which hot water is fed to a second side of the coffee pad located opposite the first side so that the hot water is pressed through the pad to obtain the beverage, which holder is provided with an outflow opening which is in fluid communication with the nozzle and/or the nozzles, and which beverage leaves the holder via the outflow opening.

31. A method according to claim 30, wherein in the siphon near the inflow opening of the siphon a filling member is included in which, in use, between an inner side of the siphon and the filling member a capillary action occurs so that the beverage flows into the siphon.

32. A method according to claim 31, wherein the filling member extends from the inflow opening of the siphon in upward direction of the siphon.

33. A method according to claim 32, wherein the filling member has the shape of a cylinder.

34. A method for preparing a beverage fit for consumption with a fine-bubble froth layer, such as coffee or cappuccino, the method comprising:
generating a liquid jet comprising the beverage;
squirting the liquid jet into a buffer reservoir so that a liquid level of the beverage is created in the buffer reservoir into which the jet squirts to obtain the fine-bubble froth layer,
providing the buffer reservoir with an outlet path for discharging the beverage with the fine-bubble froth layer from the buffer reservoir;
providing the outlet path with at least one siphon which comes into action for discharging the beverage via the siphon from the buffer reservoir when the liquid level in the siphon exceeds a predetermined height;
wherein the buffer reservoir is hermetically sealed such that it has a communication with surroundings of the buffer reservoir only via the siphon.

35. A method for preparing a beverage fit for consumption with a fine-bubble froth layer, such as coffee or cappuccino, the method comprising:
generating a liquid jet comprising the beverage;
squirting the liquid jet into a buffer reservoir so that a liquid level of the beverage is created in the buffer reservoir into which the jet squirts to obtain the fine-bubble froth layer,
providing the buffer reservoir with an outlet path for discharging the beverage with the fine-bubble froth layer from the buffer reservoir;
providing the outlet path with at least one siphon which comes into action for discharging the beverage via the siphon from the buffer reservoir when the liquid level in the siphon exceeds a predetermined height;
wherein the outlet path is further provided with at least one overflow.

* * * * *